United States Patent [19]
Buda et al.

[11] Patent Number: 6,013,892
[45] Date of Patent: Jan. 11, 2000

[54] RESISTANCE WELD CONTROL WITH LINE IMPEDANCE COMPENSATION

[75] Inventors: Paul R. Buda; Jonathan H. Bailey, both of Raleigh, N.C.

[73] Assignee: Square D Company, Palatine, Ill.

[21] Appl. No.: 09/013,721

[22] Filed: Jan. 27, 1998

[51] Int. Cl.[7] .................................................. B23K 11/24
[52] U.S. Cl. ................................................................ 219/110
[58] Field of Search .................................. 219/110, 108, 219/117.1

[56] References Cited

U.S. PATENT DOCUMENTS

| | | | |
|---|---|---|---|
| 4,289,948 | 9/1981 | Jurek et al. | 219/110 |
| 4,459,457 | 7/1984 | Jurek | 219/110 |
| 4,634,830 | 1/1987 | Furudate | 219/110 |
| 4,885,451 | 12/1989 | Farrow et al. | 219/110 |
| 4,954,686 | 9/1990 | Izume | 219/110 |
| 5,523,541 | 6/1996 | Ishikawa | 219/110 |
| 5,676,862 | 10/1997 | Matteson | 219/110 |

*Primary Examiner*—Clifford C. Shaw
*Attorney, Agent, or Firm*—Michael J. Femal; Larry I. Golden

[57] ABSTRACT

A phase controlled weld controller system uses an internal model of weld line and load impedance and of open circuit weld input voltage to develop a nominal firing angle sequence to maintain a desired weld current sequence. The weld controller computes a nominal firing angle sequence based on estimated models of line impedance, open circuit line voltage, and an estimated relation between the load current and conduction angle and the mathematical relation between firing angle, conduction angle and load circuit power that will achieve a desired weld sequence if the models are accurate. The weld controller subsequently uses measured values received in real time while the weld sequence is being executed to modify the nominal firing angle to better achieve the desired objective. This approach allows the weld controller to quickly achieve the desired weld sequence with the actual load, while permitting low feedback gains, resulting in a system that is quick and accurate in response without being overly sensitive.

17 Claims, 10 Drawing Sheets

RESISTANCE WELD CONTROL WITH LINE IMPEDANCE COMPENSATION

TECHNICAL FIELD

Applicants' invention relates generally to the field of weld controllers and more particularly to a weld controller system which automatically compensates for the effects of line impedance, which cause variations in the input line voltage, to maintain a constant output RMS current to a workpiece being welded by the weld controller.

BACKGROUND ART

Resistance welding is now widely used in most applications requiring the joining of metals, such as the steel used in the manufacturing of automobiles. With the advent of the microprocessor, weld controllers have become more sophisticated and use a variety of control techniques to ensure the quality of welds throughout the life of the contact tips as they wear out. Regardless of the process or control technique used, most weld controllers consist of several basic components. These include a weld control module, a power module, a weld transformer and the contact tips. The power module usually consists of power semiconductors such as silicon controlled rectifiers (SCRs) that switch incoming power to the weld transformer according to a preset weld program as generated by the control module. The weld transformer will transform the incoming power to a high current pulse that is coupled to the contact tips to create a weld to a workpiece that is between the contact tips.

A weld program will use phase angle control to switch the power modules. In order to maintain the desired level of heat delivered to the weld, the proper phase angle to fire the SCRs will be a function of the condition of the power source delivering power to the weld control and subsequently through the weld control to the weld transformer.

An early type of a voltage compensated welder control is disclosed in U.S. Pat. No. 4,289,948 which describes an approach for developing timing signals based on measuring the line voltage and determining its nominal value. This nominal value is compared with an expected or desirable voltage level. The difference is used in an empirically developed equation to determine a new firing angle which will be necessary to raise or lower the effective voltage applied to the weld transformer and the contact tips in order to keep the welding current constant and independent of line voltage variations. Under the assumption that the load magnitude and power factor are accurately known, and that an infinitely stiff source of voltage appears at the input to the weld controller, firing the SCRs will keep the weld current constant. However, since load impedance varies from part to part and the signature of the contact tips change due to wear, the actual line voltage is rarely the nominal design voltage.

In general, the actual line voltage is a function not only of the source voltage but also of line impedance. The line voltage can differ from the nominal designed voltage since the voltage source is a real voltage source generated by a power company and subject to a power distribution system and hence may not be at the nominal design voltage of the weld control. The presence of line impedance causes a voltage drop proportional to the current flowing into the weld. Comparing the actual weld current to a targeted load current, it is proportional to the ratio of the actual line voltage to the nominal line voltage and it is reduced by a factor that is a function of the ratio of the nominal load current to the total available nominal short circuit current of the weld.

The prior art assumes that the voltage source is stiff with no line impedance. The premise is that the weld controller is capable of measuring the line voltage of the weld controller from a present weld pulse and can correct the next weld pulse based on this measurement. In the steady state, this provides the desired result. However, there is a transient response associated with this approach which limits its effectiveness. In the steady state, the actual weld load current will be the nominal load current. However, the first two cycles of weld current are significantly lower than the nominal desired current for power distribution systems that are very stiff since the initial load current does not deviate significantly from the nominal desired current. The prior art, while providing excellent steady state response, has a transient characteristic which is undesirable in welding applications, particularly where a small number of cycles are used to create the weld, such as in aluminum welding. A weld pulse comprising only 3–6 cycles of relatively high current is very common in modern applications, so an improvement in the transient response of the weld control would be most beneficial.

It would be desirable to develop a system or method whereby this transient characteristic is reduced and the effect of line impedance can be compensated, resulting in a marked improvement in the transient performance of the the present weld controller over prior art controls.

SUMMARY OF THE INVENTION

Accordingly, the principal object of the present invention is to provide a phase controlled weld controller system that uses an internal model of weld line and load impedance and of open circuit weld input voltage to develop a nominal firing angle sequence to maintain a desired weld current or conduction angle sequence.

Another object of the present invention is to provide a phase controlled weld controller system that estimates an expected weld line and load impedance and open circuit line voltage to develop the internal model.

A further objective of the invention is to provide a method and apparatus to accurately measure the weld line and load impedance and line voltage during a weld sequence.

Yet another objective of the invention is to provide a method and apparatus for utilizing the measured and estimated weld line and load impedance to determine an expected line voltage if the desired weld sequence is maintained.

In the preferred embodiment of the invention, the invention is comprised of a system of essential elements including, but not limited to, a weld control module, a power module, a weld transformer and contact tips operating from a single phase power source. The power module consists of power semiconductors such as silicon controlled rectifiers (SCRs) or thyristors that switch incoming power to the weld transformer according to a preset program to maintain the desired weld sequence as generated by the control module. The weld transformer will transform the incoming power to a high current pulse that is coupled to the contact tips to create a weld to a workpiece that is between the contact tips.

In the phase controlled weld controller of the present invention, one control variable relates to the timing of the firing pulses to the SCRs relative to the input line voltage. As such, the weld controller is treated as a discrete time system, with the inputs, outputs and state variables represented as mathematical sequences, rather than as continuously time varying quantities, with the smallest unit in a sequence representing a half-cycle of the AC power source in time. In most resistance welding applications, and in particular the application of resistance weld controls to the fabrication of automobiles, there is usually little part to part variation in the load impedance unless there is a serious process problem, such as a tooling failure or a serious part fit-up issue. The present invention creates an internal lumped parameter model of the weld power source comprising an ideal voltage source and lumped line impedance and internal lumped parameter model of the load impedance in the form of a relation between expected load current and conduction angle. The weld controller computes a nominal firing angle sequence based on estimated models of line impedance, open circuit line voltage, and estimated relation between the load current and conduction angle and the mathematical relation between firing angle, conduction angle and load circuit power factor that will achieve the desired weld sequence if the models are accurate. This process of using such a model developed a-priori to compute nominal control signals is commonly known as a feedforward control. The weld controller subsequently uses measured values received in real time while the weld sequence is being executed to modify the nominal firing angle to better achieve the desired objective. This process of adjusting a control parameter in real time in response to an error between the target and observed parametric value is referred to as closed loop feedback control. This approach allows the weld controller to quickly achieve the desired weld sequence with the actual load, while permitting low feedback gains, resulting in a system that is quick and accurate in response without being overly sensitive.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
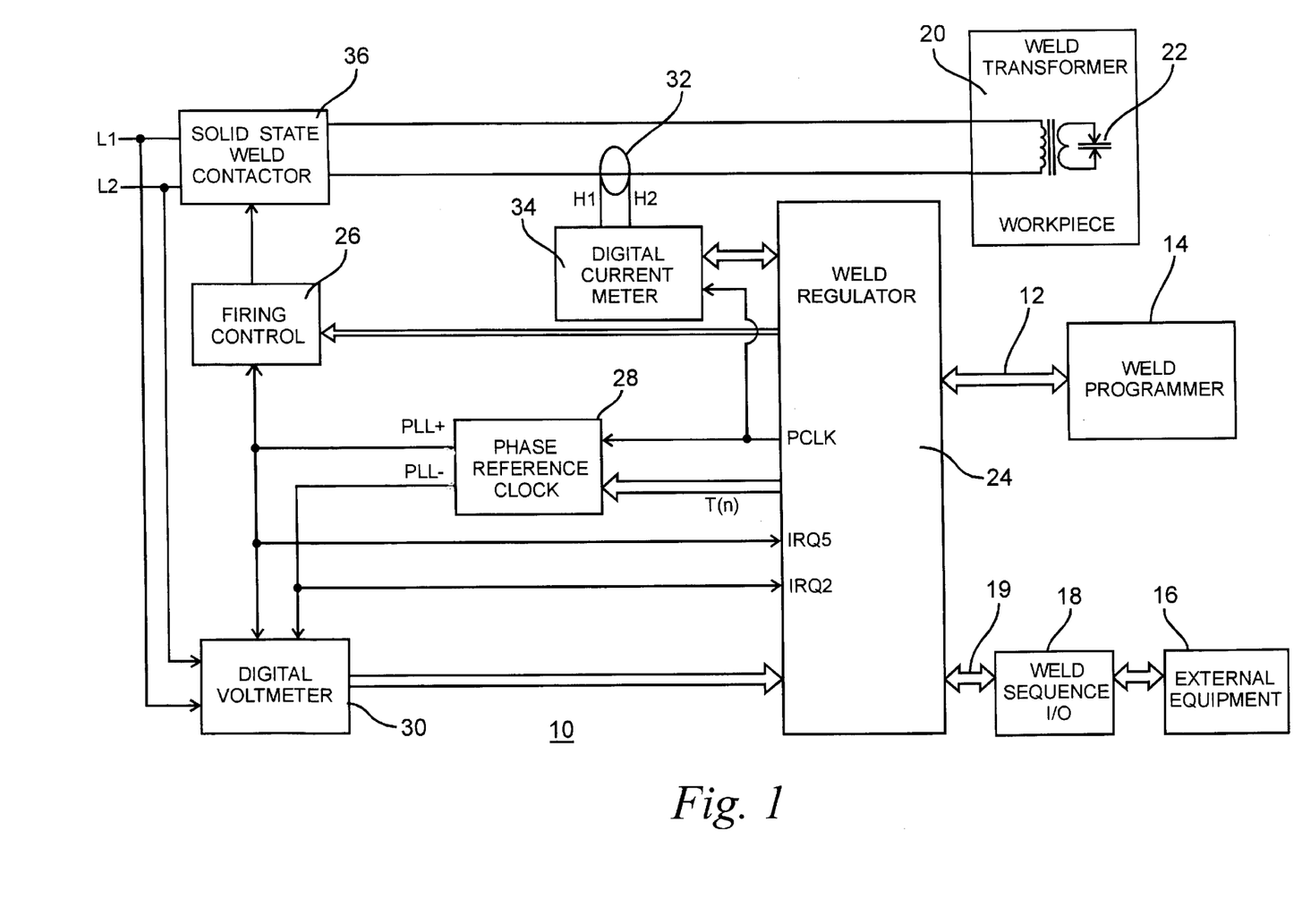
FIG. 1 shows an overview block diagram of a basic weld controller 10 according to the present invention.

FIG. 1 shows an overview block diagram of a basic weld controller 10. A source of weld power is connected to the weld controller via the input lines L1 and L2. The weld controller is programmed via a serial communication link 12 tied to a weld programmer 14, external to the weld controller 10. Once a program is entered via the Weld Programmer, execution of the weld program is initiated via external equipment program down into one or more weld command pulses 19. The output of the weld controller 10 is wired to a weld transformer 20 and gun 22, which passes current through a workpiece comprising two or more pieces of metal that are to be joined.

The weld controller 10 also includes a weld regulator 24, a firing control module 26, and a phase reference clock 28. Digital voltage meter 30 is used to measure various parameters of the input line voltage L1–L2, such as volt-time area, and polarity. A current sensor 32 generates a current signal H1, H2 proportional to the current flowing in the primary of the weld transformer 20. A digital current meter 34 is used to measure various parameters of the primary load current, such as current-time area, polarity, and conduction time.

The weld regulator 24 consists of a microprocessor, associated program and data memory, and a time base reference source such as a crystal controlled clock. The weld regulator 24 is the functional brain of the weld controller 10 and interacts with all of the other functions to generate the appropriate timing signals to fire a solid state weld contactor 36 through the firing control module 26, which is synchronized with the phase reference clock 28 under software control. The solid state weld contactor 36 switches line voltage upon command in the form of firing pulses from the firing controller. This contactor generally comprises a pair of back to back thyristors with associated snubbing, level shifting and pulse shaping circuits required to accept the firing pulses. The weld sequence I/O 18 comprises a hardware interface to external equipment 16 which may take the form of hard-wired digital inputs and outputs, or one of several serial communication interfaces per various commercial standards, and software that upon initiation of a weld program generates one or more weld command pulses 19 to the weld regulator.

The phase reference clock 28 is a free-running clock which operates independent of software delays. The phase reference clock provides an internal time base for the solid state contactor firing pulses based on an estimate of the frequency and phase of the incoming line voltage L1 and L2. The period of the phase reference clock can be set and modified under software control. In the preferred embodiment, the phase reference clock is implemented in hardware external to the weld regulator 24, utilizing a commonly available programmable counter. In operation, the counter is programmed to generate a square wave which becomes an interrupt sequence used by the weld regulator 24. The period of the counter is programmed by the weld regulator 24, which sets the period of the clock to track the input line voltage. Details of the phase reference clock 28, the digital voltmeter 30, and the digital current meter 34 are disclosed in commonly assigned U.S. patent application Ser. No. 08/866,829, filed May 30, 1997, now U.S. Pat. No. 5,869,800, and entitled "Phase Distortion Compensated Time Base for a Weld Controller", the details of which are incorporated herein by reference.

The weld controller 10 supports two weld control types: A Percent Current ( % I) weld which adjusts thyristor firing angles to regulate a voltage and line impedance compensated conduction angle representing a percentage of maximum weld current into an assumed load impedance, and a Constant Current weld which adjusts the thyristor firing angles to achieve a target current directly. The general form of % I Weld commands indicate a percentage of the maximum controllable current as determined from an estimated relation between the solid state contactor conduction angle and expected weld current as stored in a I-γ table. The term maximum controllable current will be defined subsequently. The first form of the % I command is intended to deliver a constant weld pulse of XX cycles at YY percent of maximum controllable current. The second form is intended to ramp the weld current from Y1 to Y2 percent of maximum controllable current linearly over XX cycles of weld.

The general forms of Constant Current weld commands in the weld controller 10 include a first form that attempts to deliver a weld current of YY Amperes RMS to the primary of the weld transformer over a period of XX cycles. The second form allows a user to program a desired secondary current, which the weld controller 10 subsequently converts to primary amperes from a knowledge of the weld transformer turns ratio. Similarly, the third form of the weld command attempts to create a linear ramp of weld current from Y1 Amperes to Y2 Amperes over a period of XX cycles, and the forth command allows the user to specify the weld current targets for the linear ramp in secondary kilo-Amperes, which are subsequently converted by the weld controller 10 to primary amperes.

Figure 2:
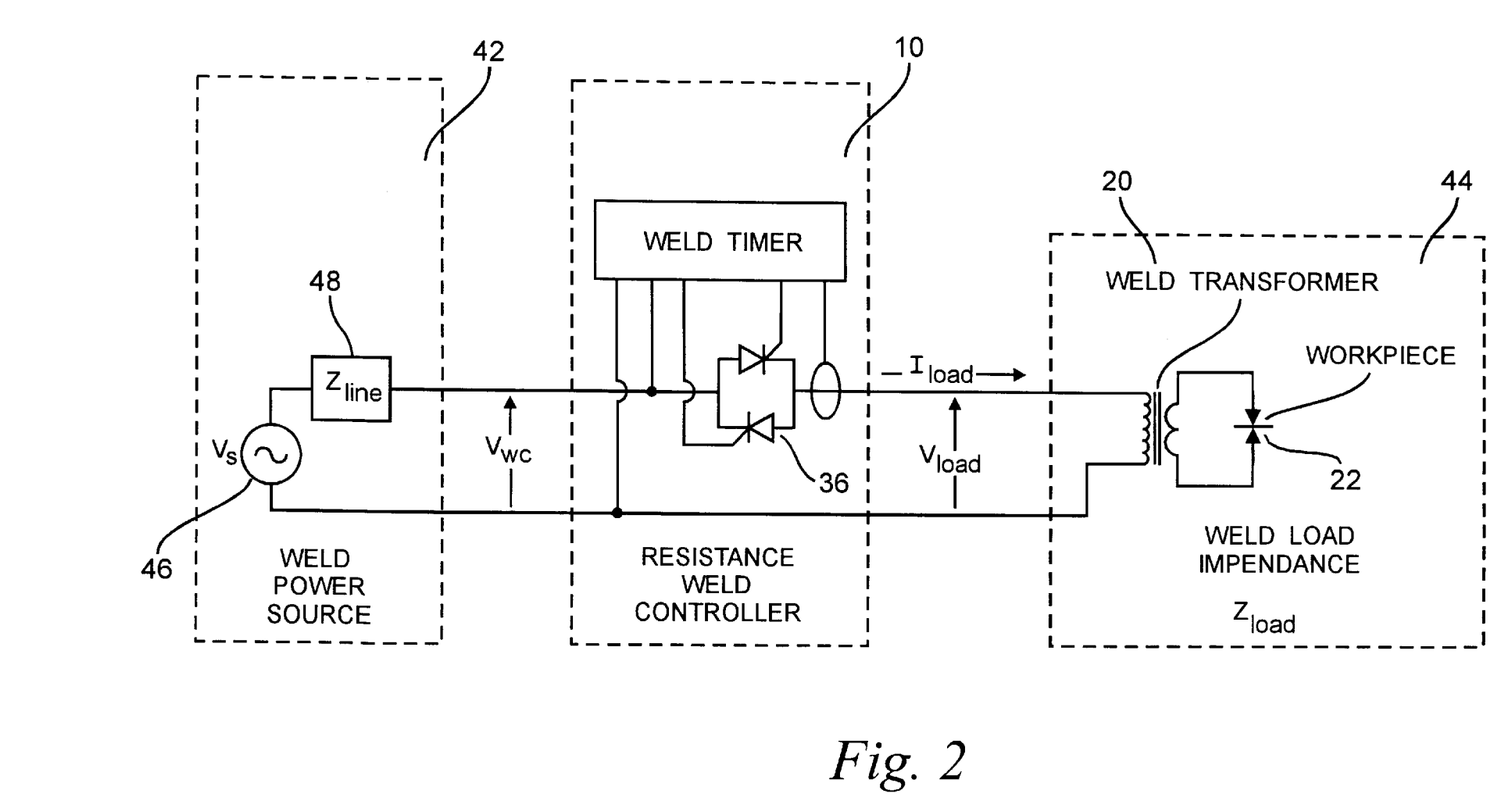
FIG. 2 is a simplified lumped parameter circuit model of the weld controller of FIG. 1, with an associated power distribution system and weld load.

FIG. 2 is a simplified lumped parameter circuit model 40 for the resistance weld controller 10, and associated power distribution system and weld load which will be used to derive mathematics of the weld controller 10. The lumped parameter model 40 comprises a weld power source 42, the weld controller 10 and a weld load impedance 44. The weld power source 42 is modeled as two circuit elements, a voltage source 46, which is assumed to be an ideal voltage source having no series impedance and a serially connected lumped line impedance, $Z_{line}$, which is assumed to be ideal and linear and which generates a voltage drop between the ideal voltage source and the weld control proportional to the weld load current. The weld controller 10 is capable of observing the load current $I_{load}$ and the voltage applied at its input terminals, $V_{wc}$. Utilizing thyristor based phase control, the weld controller generates a weld voltage $V_{load}$ at its output terminals, with a corresponding weld current load. The weld load impedance 44 comprises the weld transformer 20, workpiece, tooling 22, fixtures and other sources of impedance. To simplify the mathematics, the impedance of all these elements are lumped into a single impedance quantity reflected at the output terminals of the weld control as $Z_{load}$. When the weld control applies the voltage $V_{load}$ upon the load impedance, the resulting current is $I_{load}$.

The relationship between Thyristor voltage and current when conducting into an inductive load, as in the case in a normal resistance weld application, is well known. In order to maintain independence of frequency in the discussion that follows, the sinusoidal voltage source is scaled in degrees instead of time. With the sinusoid defined in degrees, the thyristor is fired at an angle α with respect to the phase reference clock which nominally tracks the zero crossings of the sinusoidal voltage source, at which time the thyristor begins to conduct current. The relationship between the line voltage and line current while conducting is proportional to:

$$i(\phi) = \begin{cases} 0 & 0 < \phi < \alpha \\ e^{-\left(\frac{\phi-\alpha}{\tan(\theta)}\right)}\sin(\alpha-\theta) + \sin(\phi-\theta) & \alpha \leq \phi \leq \alpha+\gamma \\ 0 & \phi > \alpha+\gamma \end{cases} \quad (1)$$

where φ is the angle of observation, α is the angle with respect to the zero crossing of the line voltage at which the Thyristor is fired, θ is the lag angle of the load and γ is the conduction angle of the Thyristor, the smallest angle for which $$e^{-\left(\frac{\alpha+\gamma}{\tan(\theta)}\right)}\sin(\alpha-\theta) + \sin(\alpha+\gamma-\theta) = 0, \gamma > 0 \quad (2)$$

is satisfied. The lag angle of the load impedance, θ in Equation (1), is related to the circuit power factor, pf, by:

$$\theta = \arccos(pf) \quad (3)$$

Assuming the lumped parameter model 40 of FIG. 2, for a normalized ideal source of weld voltage 46 containing no line impedance (48) and a normalized welding load impedance 44 that is inductive in nature, the RMS current that results from a half-cycle of conduction of the Thyristor as a function of the weld conduction angle and the power factor can be shown graphically. In the lumped parameter model 40, the load can be completely characterized by an I-g curve. To do so, it is sufficient to have a knowledge of the circuit power factor, which uniquely dictates the "shape" of the load impedance characteristic and the weld current at one conduction angle and at a known voltage. The maximum current that can be generated at full 180 degree conduction and at nominal line voltage is henceforth referred to as $I_{180}$ and is related to the nominal load impedance $Z_{load}$ by:

$$I_{180} = \frac{V_{nom}}{Z_{load}} \quad (4)$$

Figure 3:
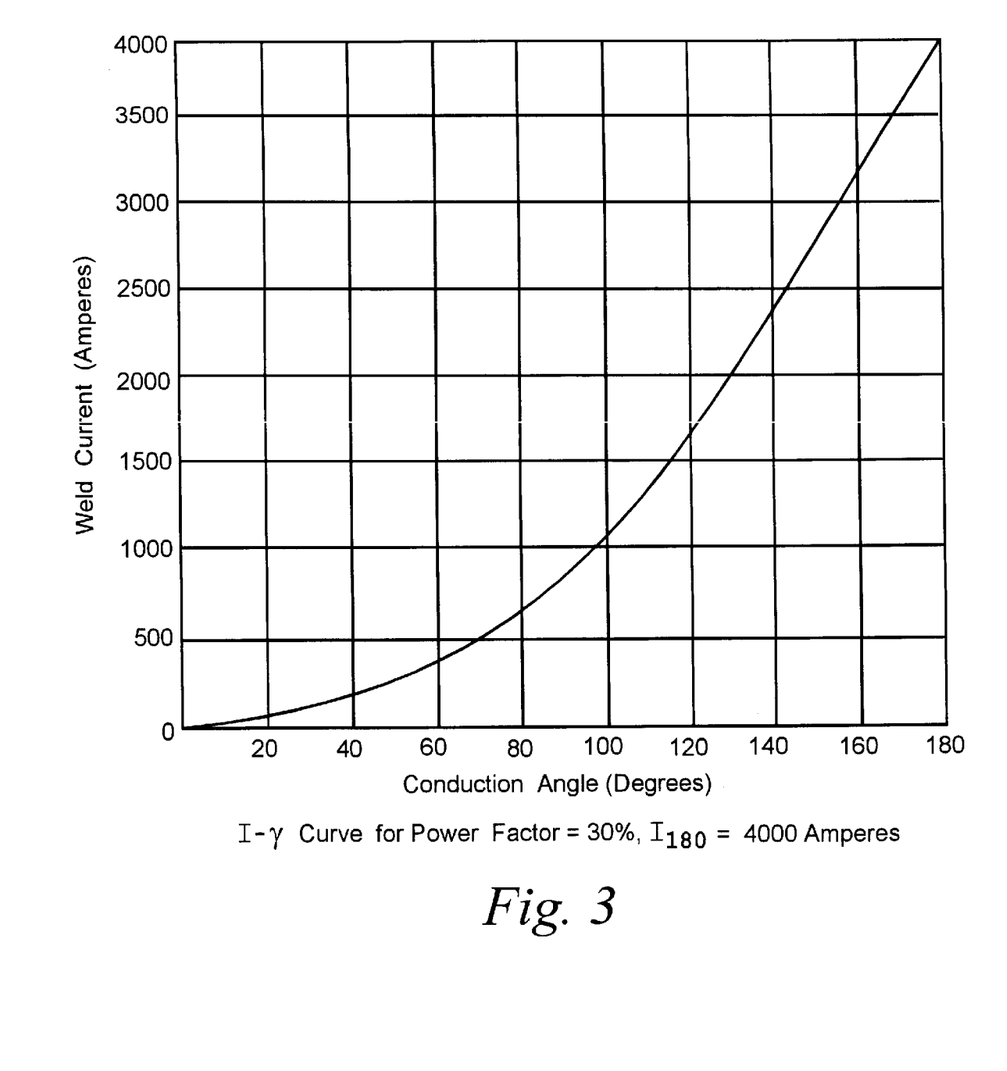
FIG. 3 shows a graphical curve relating actual weld current to conduction angle for a power factor of 30% and a maximum current of 4000 Amperes.

Given the value of $I_{180}$ and the normalized I-γ curve for the load impedance, the curve relating the actual weld current to the conduction angle can be constructed. FIG. 3 shows such a curve for a power factor of 30% and a maximum current, $I_{180}$ of 4000 Amperes. Given FIG. 3, and a desired weld current, the conduction angle required to achieve the desired current can be determined from the graph. Furthermore, Equations (3) and (4) above relate the firing angle, conduction angle and load power factor. As such, a table-lookup scheme with linear interpolation in both the firing angle and conduction angle directions is employed to determine the circuit power factor and firing angle. This becomes a Dynamic I-γ curve (DIG) model, maintained within the weld controller 10 and provides an expected relationship between the conduction angle and expected resulting weld current at nominal line voltage, $V_{nom}$. This information is used as the basis for computing a feedforward term in a weld controller weld regulator control strategy.

The objective of the feedforward term in the weld controller regulator strategy is to create a line voltage sequence of the form:

$$V_{load}(n) = V_{nom} * \% I_{max}(n) \quad (5)$$

where $V_{nom}$ is the value of the power source to which the controller was designed, for example 480 VAC in the United States, and % $I_{max}(n)$ is the percentage of maximum controllable weld current represented by the target weld current and as determined from the DIG model. In the present invention, the maximum controllable weld current, $I_{max}$, is defined as that current given by the Dynamic I-γ curve at 170 degrees conduction angle, allowing for a 10 degree correction in conduction angle target to compensate for the effects of line voltage variation and line impedance at the highest % I values. When a % I weld is programmed, the target current is the percentage of $I_{max}$ indicated. Similarly, the % I corresponding to a target current in a constant current weld is determined by dividing the target current by $I_{max}$.

Variations in the actual current observed at the given conduction angle are due to two sources. The line voltage is not the nominal line voltage on which the DIG model is based or the DIG model is not an accurate representation of the load impedance. Using Eq. 4, and defining a sequence of line voltages appearing at the input of the weld control as $V_{wc}(n)$, and assuming that the internal model of the load impedance matches the actual load impedance, based on the interpretation of the pth weld command by the weld controller 10, a target current sequence, $I_t(n)$ and the resulting firing angle sequence, α(n). the actual resulting load voltage generated by the weld controller will be $$V_{load}(n) = V_{wc}(n) * \% \, I_{max}(n) \tag{6}$$

The feedforward path of the weld controller will generate a firing angle that attempts to apply this percentage of the nominal weld voltage to the load.

The present invention estimates a line that will result when the SCRs are fired. This estimated line voltage sequence is defined as $V_{est}(n)$ and a new target current sequence, $I_{tc}(n)$ can be estimated using $$I_{tc}(n) = I_t(n) * \frac{V_{nom}}{V_{est}(n)} \tag{7}$$

Substituting this new target current in (5), and rearranging terms, the resulting voltage can be shown to be:

$$V_{load}(n) = \left( \frac{V_{wc}(n)}{V_{est}(n)} \right) * V_{nom} * \% I_{max}(n) \tag{8}$$

Comparing (8) and (6) it is seen that if the system can accurately estimate the resulting line voltage sequence, such that $V_{wc}(n)$ and $V_{est}(n)$ are equal, the expression in parentheses in (8) will be unity and the weld control will generate the appropriate target line voltage sequence, $V_t(n)$ according to (6).

Figure 4:
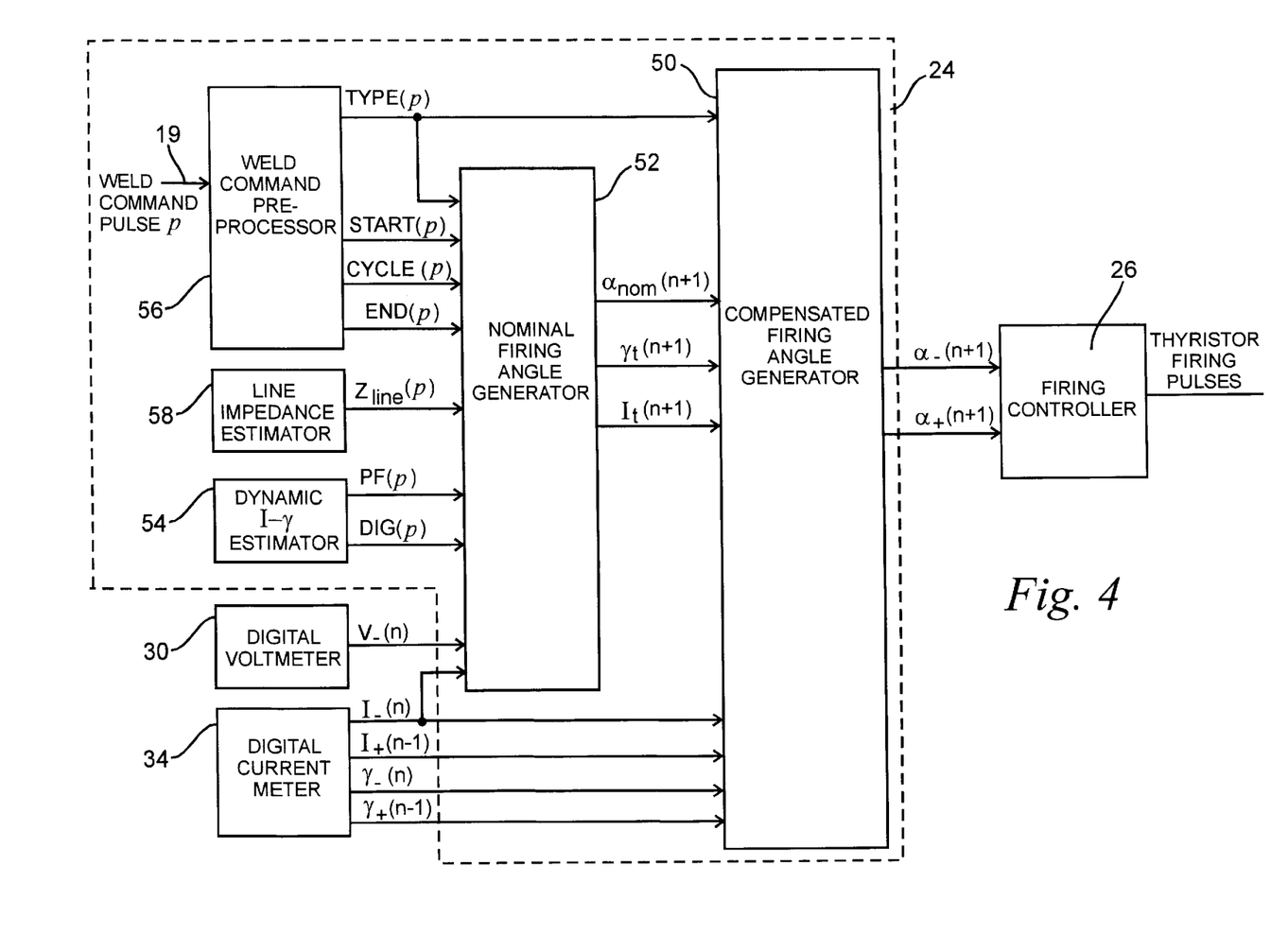
FIG. 4 is a detailed block diagram of the weld regulator shown in FIG. 1.

FIG. 4 shows a block diagram of the weld regulator 24 of FIG. 1. It is the central element of the weld controller 10 and interacts with all of the other functions to determine and generate the appropriate timing signals to fire the thyristors through the firing controller module 26. Its function is to develop a nominal firing angle sequence that would develop a correct weld sequence, assuming that the load impedance, line impedance and line voltage can be estimated exactly, then make minor adjustments to the nominal sequence based on the actual observed behavior of the system while in operation. The two main blocks of the weld regulator 24 are a compensated firing angle generator 50 which modifies the nominal sequence, and a nominal firing angle generator 52.

To generate the nominal firing angle and target conduction angle and current sequences, the nominal firing angle generator 52 needs several inputs. First, a weld command preprocessor function 56 derives information from the pth weld pulse command as programmed by an operator, including a starting target value, StartI(p), of primary current for this pth pulse, an ending target value, EndI(p), of primary current for this pth pulse, the number of cycles Cycles(p) of weld in the pth pulse, and the weld type (% I or CCWELD), labeled Type(p).

In the case of a Constant Current weld, preprocessing involves converting any secondary current values entered into primary currents (using the specified transformer turns ratio) and extracting the information above. In the case of a % I weld, the programmed percentages are converted into target primary currents by multiplying the user programmed percentage by $I_{max}$, the current from the DIG that would be supplied by the weld control into the nominal estimated load at nominal designed voltage at a conduction angle of 170 degrees as described above. StartI(p), EndI(p), Cycles(p) and Type(p) are all inputs to the nominal firing angle generator 52, and Type(p) is also an input to the compensated firing angle generator.

A line impedance estimator function 58 provides an estimate of the line impedance $Z^*_{line}$ to the nominal firing angle generator 52. A dynamic I-γ estimator function 54 maintains an a-priori estimate of the load power factor, PF(p), and a table of estimated I-γ values, DIG(p), both derived from previous welds using a method to be described subsequently. The digital voltmeter function 30 furnishes an estimate $V_-(n)$ of the RMS line voltage for the negative half cycle of each cycle of line voltage to the nominal firing angle generator 52. The digital current meter function 34 furnishes an estimated sequence $I_-(n)$ of the RMS current for each negative half cycle, to both the nominal firing angle generator 52 and compensated firing angle generator 50, as well as furnishing the sequence of estimated positive half-cycle current, $I_+(n-1)$, the negative conduction angle sequence, $\gamma_-(n)$ and positive conduction angle sequence $\gamma_+(n-1)$ to the compensated firing angle generator 50.

With the inputs as given above, the nominal firing angle generator 52 provides a sequence of nominal firing angles, $\alpha_{nom}(n+1)$, a compensated target conduction angle sequence, $\gamma_\tau(n+1)$ and a target current sequence, $I_t(n+1)$ to the compensated firing angle generator 50. The compensated firing angle generator 50 provides a sequence of positive half-cycle firing angles, $\alpha_+(n+1)$ and a sequence of negative half-cycle firing angle values $\alpha_-(n+1)$ to the firing controller 26, which outputs of the sequence of electrical impulses that trigger the thyristor, causing weld current to flow.

Figure 5:
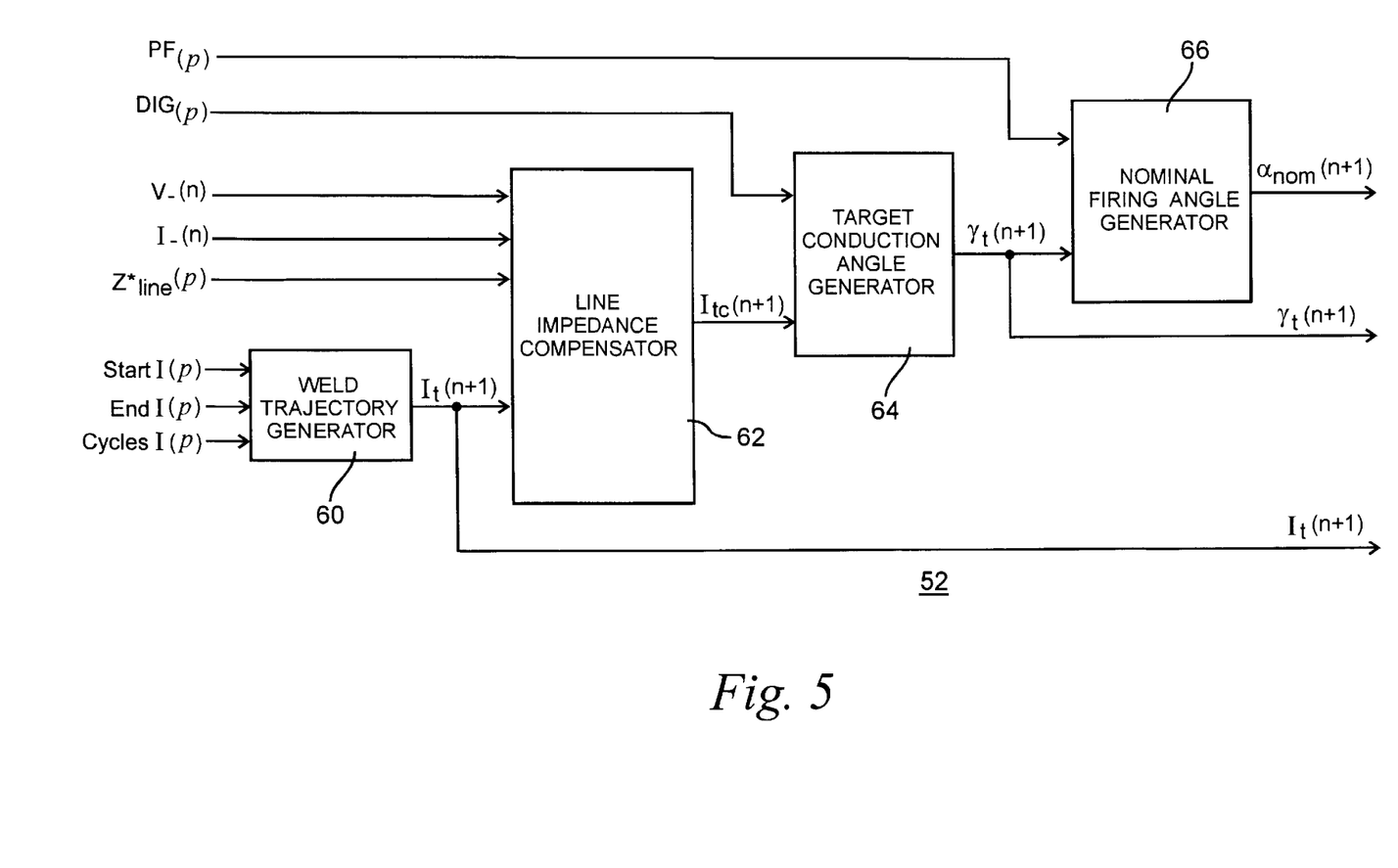
FIG. 5 provides details of the nominal firing angle generator shown in FIG. 1.

FIG. 5 provides details of the nominal firing angle generator 52. A weld trajectory generator 60 generates a sequence, $I_t(n+1)$, of nominal target currents, with the index "n+1" denoting that the output of the trajectory generator is the value of the nominal current for the next cycle of weld. The sequence generated by the weld trajectory generator 60 is given by:

$$I_t(n) = \begin{cases} EndI(p) & Cycles(p) = 1 \\ StartI(p) + (n-1)\dfrac{EndI(p) - StartI(p)}{Cycles(p) - 1} & n = 1, 2, \cdots, Cycles(p) \quad Cycles(p) > 1 \end{cases} \tag{9}$$

A line impedance compensator function 62 adjusts the nominal current trajectory computed by the weld trajectory generator 60 for the effects of line impedance and voltage variations according to the mathematics above. The estimate of line impedance $Z_{line}^*(p)$ for the pth weld pulse, generated by the line impedance estimator function 58 is one input to the line impedance compensator 62, as well as the cycle number. The line voltage estimate from the previous weld cycle, $V_-(n-1)$ is furnished to the line impedance compensator 62 from the digital voltmeter 30. Also furnished is the nominal line voltage, $V_{nom}$, a design parameter dependent on the application of the control. The output $I_{tc}(n+1)$, of the line impedance compensator 62, is given by:

$$I_{tc}(n+1) = \begin{cases} I_t(n+1) \dfrac{V_{nom}}{(V_s^*(p) - I_t(n+1) * Z_{line}^*(p))} & n = 0 \\ I_t(n+1) \dfrac{V_{nom}}{V_{line}(n)} & n = 1, 2, L\ Cycles(p) - 1 \end{cases} \quad (10)$$

in the % I mode, and $$I_{tc}(n+1) = I_t(n+1) * \frac{V_{nom}}{(V_s^*(p) - I_t(n+1)Z_{line}^*(p))} \quad (11)$$

in the Constant Current mode, where $V_s^*(p)$ is computed using the line voltage and line current from the half-cycle just prior to initiation of the present weld pulse using:

$$V_s^*(p) = V_-(0) + I_-(0)Z^*_{line}(p) \quad (12)$$

The voltage compensated target current sequence $I_{tc}(n+1)$ is implemented in the weld control software and a new value of $I_{tc}(n+1)$ is computed for every cycle.

The sequence of line impedance compensated target currents, $I_{tc}(n+1)$, is subsequently fed to a target conduction angle generator 64, which utilizes the Dynamic I-γ curve sequence DIG(p) generated by the dynamic I-γ estimator function 54 to compute a sequence of target conduction angles, $\gamma_t(n+1)$ for the next pulse. This target conduction angle sequence, along with the estimate of the system power factor, PF(p), also furnished by the dynamic I-γ estimator 54, is fed to a nominal firing angle generator 66, which utilizes a digitized version of a surface relating firing angle, conduction angle and power factor and a combination of a table-lookup scheme and linear interpolation in two dimensions to compute a nominal firing angle sequence $\alpha_{nom}(n+1)$. The output sequence $\alpha_{nom}(n+1)$ becomes the feedforward firing angle sequence in the weld controller 10 strategy and is one input to the firing angle compensator 50, the internal operational details of which take different forms dependent upon the weld type (% I or Constant Current).

Other inputs to the firing angle compensator 50 are the measured positive and negative conduction angle sequences $\gamma_+(n-1)$ and $\gamma_-(n)$, the measured positive and negative current sequences, $I_+(n-1)$ and $I_-(n)$, all of which are furnished by the digital current meter 34, and the weld type (Constant Current or % I). The outputs of the firing angle compensator are two sequences of firing angles, $\alpha_-(n+1)$ and $\alpha_+(n+1)$.

Figure 6:
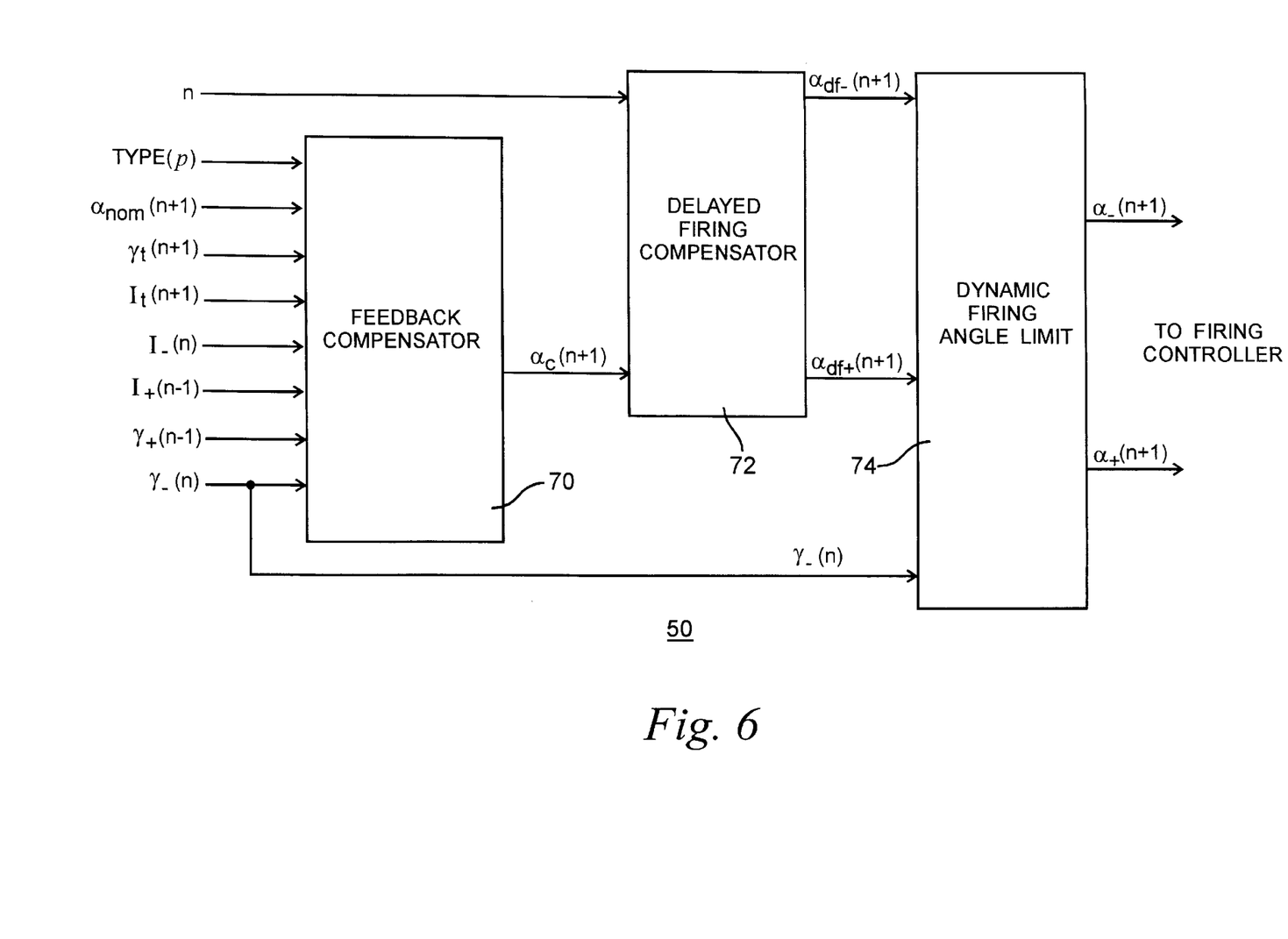
FIG. 6 shows an expanded block diagram of the firing angle compensator shown in FIG. 1.

FIG. 6 shows an expanded block diagram of the firing angle compensator 50. The weld type, nominal firing angle, target conduction angle sequence, target current sequence and the measured currents and conduction angles from the previous positive and negative half cycles are inputs to a feedback compensator function 70. The output of the feedback compensator 70 is the sequence of compensated firing angles, $\alpha_c(n+1)$, and represent the system's best guess of the correct firing angles to employ on the next full cycle of welding. This sequence of firing angles $\alpha_c(n+1)$ is subsequently passed through a delayed firing compensator function 72, which applies a lower limit to the first and last half cycle of a weld pulse under certain circumstances.

The outputs of the delayed firing generator 72 are the respective target firing angles for the next cycle of weld, $\alpha_{df-}(n+1)$ and $\alpha_{df+}(n+1)$.

One final check on the computed firing angles is performed prior to converting them to timing signals and applying firing pulses to the thyristors. A dynamic firing angle limit function 74 is applied to the firing pulse based on the previous negative half cycle firing angle $\alpha_{df-}(n)$ and the resulting observed conduction angle $\gamma_-(n)$ to ensure that the firing angles do not cause a half-cycling condition. These values are converted to timer counts and subsequently feed a firing angle timer.

Figure 7:
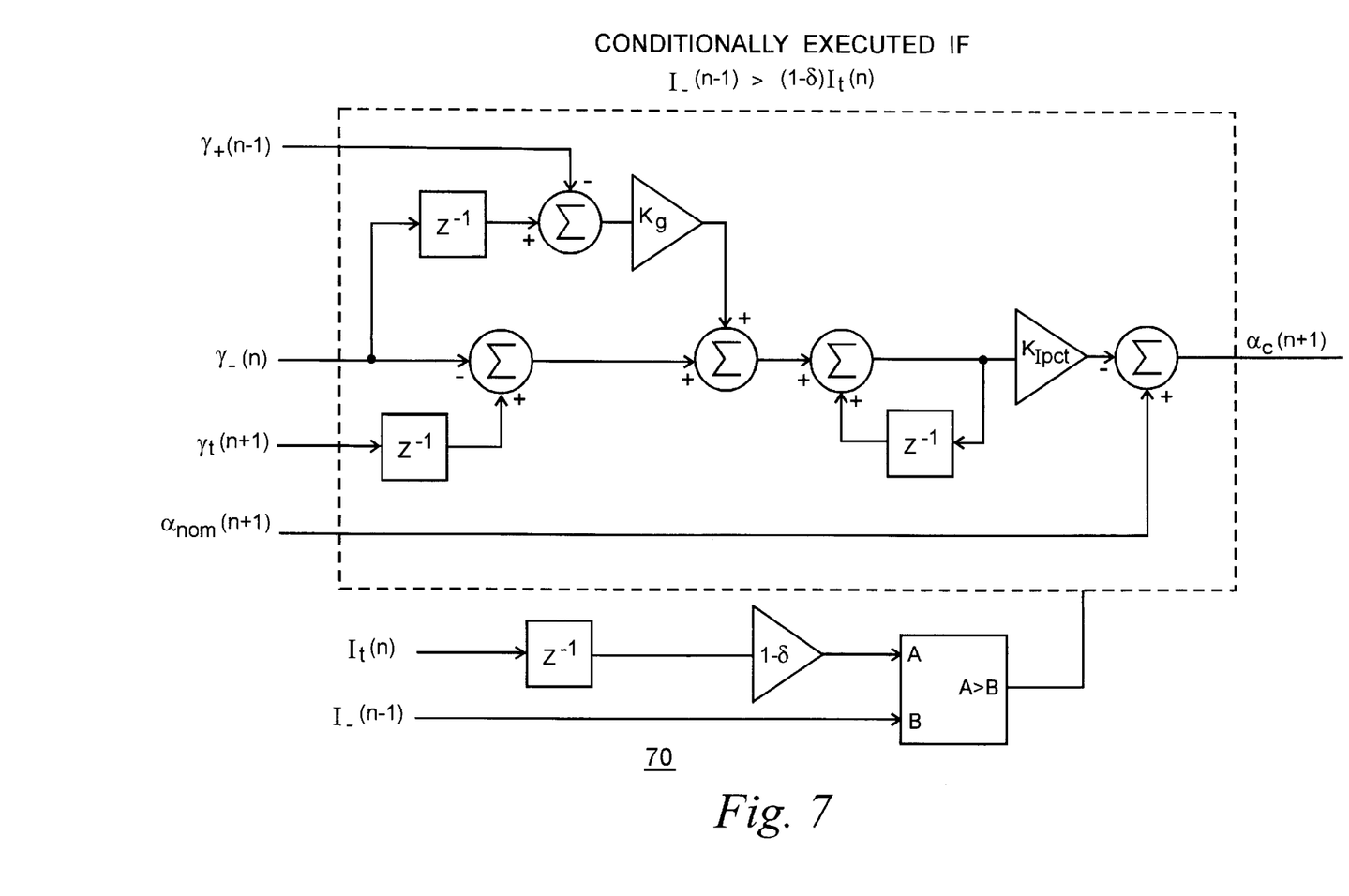
FIG. 7 expands the feedback compensator function of FIG. 6 in a % I welding mode.

FIG. 7 expands the feedback compensator 70 of FIG. 6 in the % I mode. This system block is implemented in system software and is conditionally executed on each cycle of weld based on the test:

$$I_-(n-1) > (1-\delta)I_t(n-1) \quad (13)$$

The weld controller 10 tests the previous weld current to ensure that it lies within a percentage of its target value. This condition would be violated if, for instance, insufficient pressure were applied to the weld gun so that it did not close, or if there was an insulating substance between the weld electrode(s) and the workpiece such as a sticker. If the weld current from the previous negative half cycle is not greater than the expected minimum current as given by (12), the weld controller 10 freezes the closed loop feedback control for that cycle, using the previous firing angle until either the programmed number of cycles is complete, a more serious error condition is detected or the current falls within the range prescribed by (12). In the present implementation, δ is set at 0.25, which means that the measured weld current needs to be within 75% of the expected value for the compensation algorithm to be executed. Given that the condition described in (12) is satisfied, in the % I mode the weld controller computes the value of the state variable x1(n) given by:

$$x1(n) = x1(n-1) + (\gamma_t(n) - (\gamma_-(n)) + K_g(\gamma_-(n-1) - \gamma_+(n-1)) \quad (14)$$

and the next target firing angles, α(n+1) by $$\alpha_c(n+1) = \alpha_{nom}(n+1) + K_{Ipct}*x1(n) \quad (15)$$

where, $K_g$ is the imbalance gain of the control loop, and $K_{ipct}$ is the integral gain term. In the present weld controller 10, $K_g$ and $K_{ipct}$ are set to 0.5 each.

Figure 8:
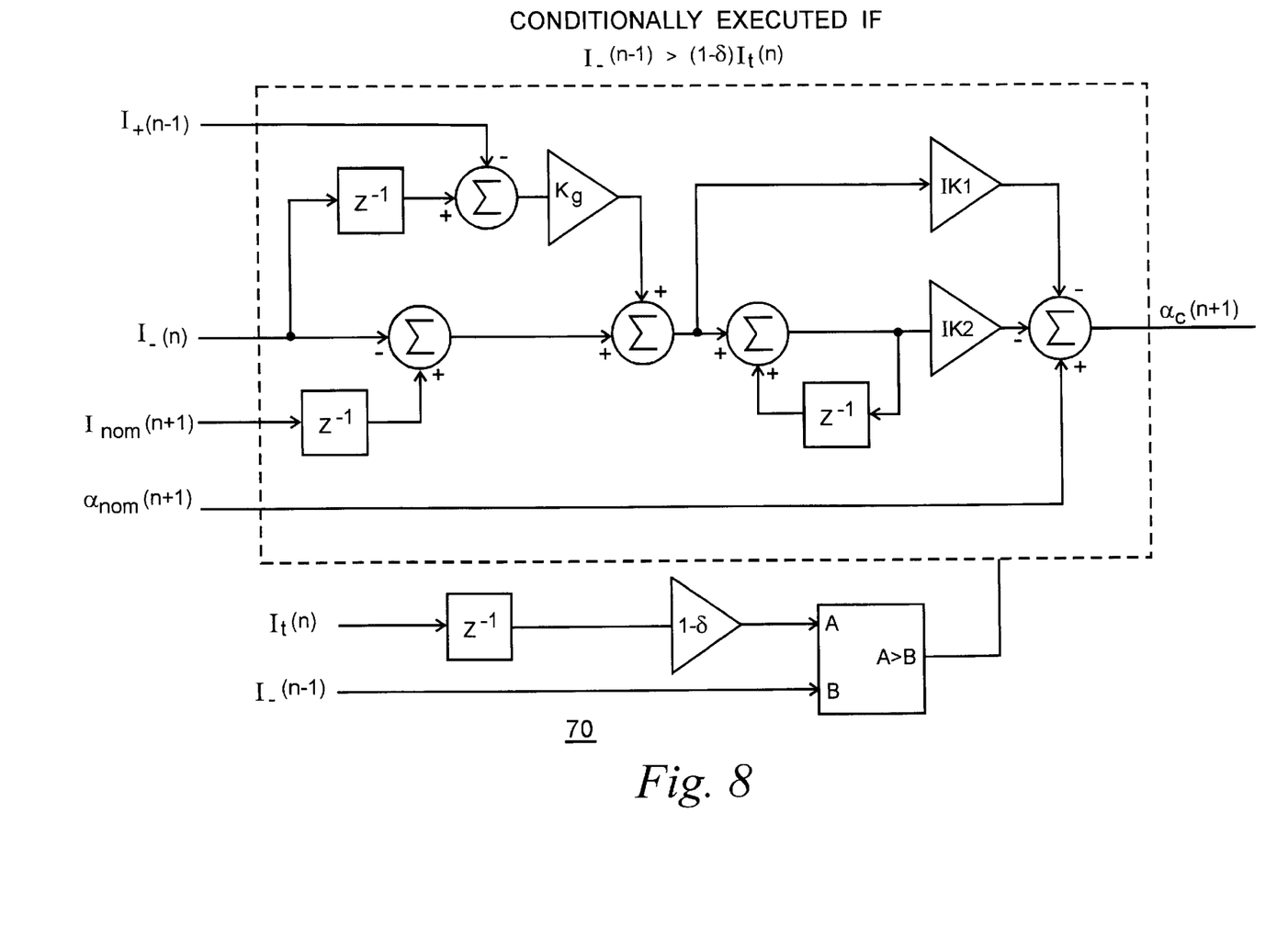
FIG. 8 expands the feedback compensator function of FIG. 6 in a Constant Current welding mode.

FIG. 8 shows the feedback compensator function 70 in the Constant Current welding mode. Again, the compensator is executed conditionally according to Equation (12) above. In this case, the nominal firing angle is adjusted based on a direct comparison of the nominal weld current against the observed weld current. Two state variables, labeled x1(n)

and x2(n) are shown in FIG. 8. The sequence relating each of these is given by:

$$x1(x1)=(I_{nom}(n)-I_-(n))+K_g(I_-(n-1)-I_+(n-1)) \quad (16)$$

and $$x2(n)=x2(n-1)+x1(n) \quad (17)$$

and the sequence generating α(n+1) is given by:

$$\alpha_c(n+1)=\alpha_{nom}(n+1)-IK1*x1(n)-IK2*x2(n) \quad (18)$$

where IK1 and IK2 are constants. In the weld controller, values of IK1 and IK2 are presently $100/I_{180}$ and $100/I_{180}$ respectively.

Figure 9:
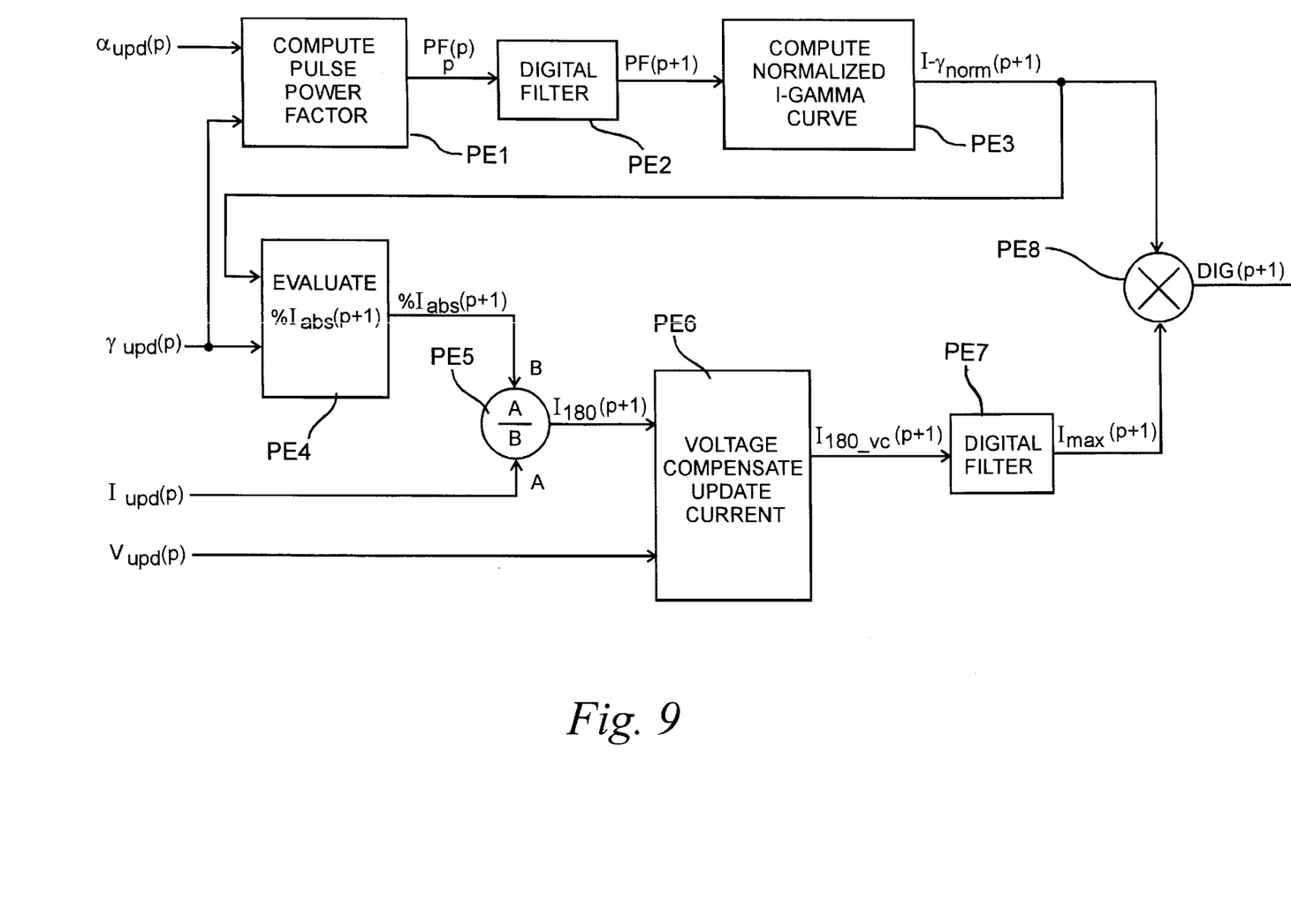
FIG. 9 expands the dynamic I-g estimator function of the weld regulator shown in FIG. 1.

FIG. 9 expands the dynamic I-g estimator 54 of the weld regulator 50. In the preferred embodiment, the firing angle $\alpha_{upd}(P)$, resulting conduction angle $\gamma_{upd}(p)$, measured line voltage $V_{upd}(p)$ and measured load current $I_{upd}(P)$ corresponding to the last negative half cycle of weld pulse p are used to compute a new estimate of the load impedance power factor and corresponding I-γ curve. $\alpha_{upd}(p)$ and $\gamma_{upd}(p)$ are inputs to a routine shown in the block diagram as Compute Pulse Power Factor (PE1). This function utilizes the digitized relation between firing angle, conduction angle and power factor described previously in a table lookup scheme with interpolation to compute the weld load power factor from a knowledge of the firing angle and conduction angle. The output of this function is a scalar quantity labeled $PF_p(p)$. This scalar power factor forms the input to a digital filter (PE2), which computes an estimated system PF(p+1), reducing weld to weld fluctuations in estimated system power factor. The filter used in the weld controller takes the form:

$$x(n+1)=k_{fr}u(n)+(1-k_{fr})x(n) \quad (19)$$

where x(n+1) denotes the output of the filter, u(n) denotes the input to the filter, x(n) denotes the filter output value prior to the update and $k_{fr}$ is a constant ranging between 0 and 1. In the present weld controller 10, $k_{fr}$ is presently set to a value of 0.25. The initial value of the filter in the weld controller 10 is 30%, which represents the lowest value of power factor likely to be seen in the resistance welding application.

In the weld controller 10, the DIG for a given weld schedule is represented by a vector of 19 points corresponding to increments of 10 degrees of conduction angle between the ranges of 0 to 180 degrees inclusive. A digitized representation of the surface in FIG. 7 is stored in the microprocessor's memory. The estimated power factor pf(p+1) is input to a software function that uses a combination of a table lookup and linear interpolation to compute a vector of normalized I-g values as a function of the power factor (PE3). The output of this function is labeled I-$\gamma_{norm}$(p+1,γ). The normalized I-g table is subsequently evaluated at the update conduction angle, $\gamma_{upd}$ (PE4) to determine the percentage of maximum current represented by the conduction angle. This value is denoted % $I_{abs}$(p+1).

The estimated current available at 180 degrees conduction angle, $I_{180m}$(p+1) is determined by dividing (PE5) the actual measured update current, $I_{upd}(p)$ by % $I_{abs}$(p+1). $I_{180m}$(p+1) is an estimate of the maximum current attainable by the weld controller at full conduction, assuming the voltage source is stiff and at the line voltage measured, $V_{upd}(p)$. Since the Dynamic I-γ table is defined as the operating characteristic of the weld control at nominal line voltage, $I_{180m}$(p+1) is adjusted for the line voltage by multiplying by the ratio of the nominal line voltage to the measured line voltage, $V_{upd}(p)$ (PE6). The output of this voltage compensator is $I_{180vc}$(p+1). This value is subsequently passed through a digital filter (PE7) in a manner identical to that of the pulse power factor to obtain the maximum current estimate $I_{180}$(p+1). By multiplying each element of the normalized I-γ table, I-$\gamma_{norm}$(p+1) by the maximum current estimate $I_{max}$(p+1) (PE8), an estimate of the I-γ characteristic for the weld control DIG(p+1) is obtained.

It is to be noted that the DIG estimate could be made in several other ways without violating the spirit of the present invention. One implementation that has been successfully demonstrated uses the average weld voltage and weld current for the pth weld pulse as the update value.

The line impedance estimator 58 uses measured line voltages and currents from previous welds to develop estimates of the magnitude of line impedance. It is assumed that the line impedance varies slowly with respect to the weld pulse. For instance, while a resistance weld control may be called upon to make several welds in a minute, it is assumed that changes in line impedance are detectable over time periods considerably larger. No such assumption is made regarding changes in the Thevenin equivalent voltage of the lumped parameter block diagram of FIG. 1, so that some care is required in the estimation process as described below.

Figure 10:
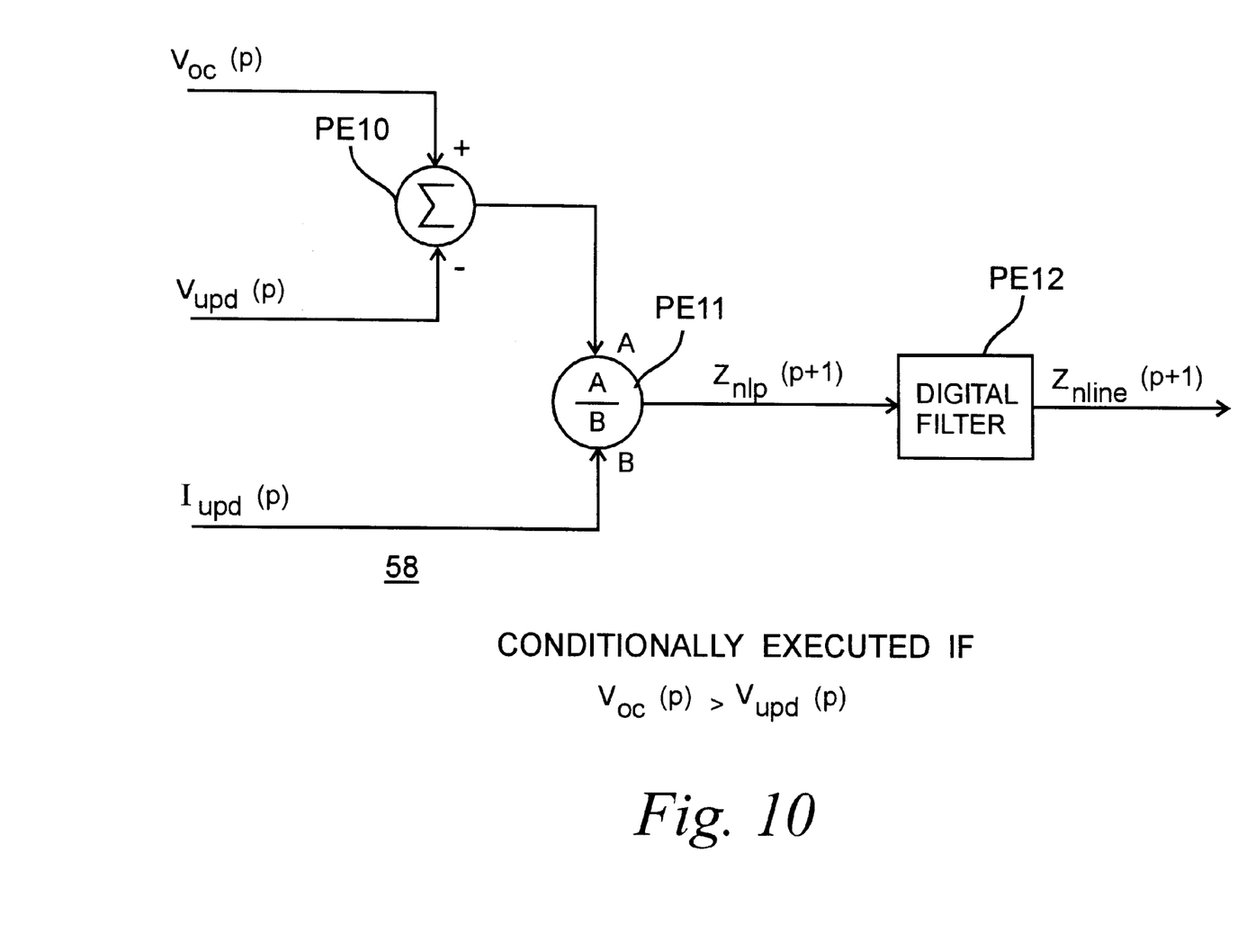
FIG. 10 shows a process for computing a new estimate of line impedance used by the dynamic estimator shown in FIG. 4.

FIG. 10 shows the process of computing a new estimate of line impedance. This estimate is computed after each "normally completed" weld pulse, subject to validation of the data. In FIG. 10, the quantity $V_{oc}(p)$ is the last known open circuit voltage, i.e. the line voltage of the last half cycle for which it is known that no weld current flowed. It is assumed that $V_{oc}(p)$ accurately represents the value of the Thevenin equivalent voltage source $V_s$ in the lumped parameter model of FIG. 3, and that value does not change appreciably during the weld pulse. It is recognized in the design that this is not always an accurate assumption, so as an initial test, the open circuit voltage, $V_{oc}(p)$ is first compared PE10 against the update voltage, $V_{upd}(p)$, which is the same line voltage associated with the last negative half cycle of weld current used to update the DIG as described above. If the update voltage, $V_{upd}(P)$ is greater than or equal to $V_{oc}(p)$, then clearly the value of the Thevenin equivalent voltage source $V_s$ in FIG. 3 has changed considerably and no update of the line impedance estimate is made.

Assuming the open circuit voltage is greater than the update voltage, an estimate of the line impedance for the pulse, $Z_{nlp}(P)$ is computed PE11 using $$Z_{nlp}(p) = \frac{V_{oc}(p) - V_{upd}(p)}{I_{upd}(p)} \quad (20)$$

This value is filtered through a digital filter PE12 in a manner identical to above to achieve the estimate of line impedance $Z_{line}^*(p+1)$ used in the line impedance compensation calculations.

It is noted that the estimate of line impedance could be made in several other ways without violating the spirit of the invention. One implementation that has been successfully demonstrated uses the average weld voltage and weld current for the pth weld pulse. A second implementation that has been successfully demonstrated uses voltage and current data from the first half cycle of the weld pulse as the update cycle.

While the specific embodiments have been illustrated and described, numerous modifications are possible without departing from the scope or spirit of the invention. The above description refers to a weld controller application.

However, the principles described are readily applicable to any type of control system using voltage phase control, including motor controls such as AC or DC drives, inverters, power supplies, and the like.

We claim:

1. A digital weld control system for a resistance welder of the type connecting and disconnecting through a welding contactor, a welding transformer load from an alternating current weld power source to control timing periods of a welding sequence and a level of heat intensity in the weld to ensure quality welds, the digital weld control system comprising:
   A. a phase reference clock;
   B. a voltmeter;
   C. a current meter;
   D. a firing control;
   E. an impedance estimator for estimating load impedance magnitude and power factor based on data from previous welds;
   F. a power source estimator for estimating a source power based on a lumped parameter model of the weld power source; and
   G. control means responsive to the lumped parameter model and an estimated voltage drop caused by the presence of line impedance in the weld power source for adjusting firing points of the welding contactors in a next preceding line voltage cycle and for maintaining welding current constant and independent of line voltage variations and independent of actual weld current drawn by the welding transformer load.

2. The digital weld control system of claim 1 in which the lumped parameter model of the power source includes an ideal voltage source and a lumped line impedance.

3. The digital weld control system of claim 2 in which the power source estimator estimates the voltage of an ideal voltage source and a lumped line impedance of the power source.

4. A method of estimating a value of an ideal voltage source and line impedance for use in resistance welder control applications comprising:
   a. measuring a line voltage and a resulting load current on a first cycle of line voltage;
   b. measuring the line voltage and resulting load current on a second cycle of line voltage in which the load current is different than the first cycle measured load current;
   c. computing a voltage difference between the line voltage of the first cycle and that of the second measured cycle;
   d. computing a current difference between the first cycle measured load current and second cycle measured load current;
   e. dividing the voltage difference by the current difference to obtain the estimate of line impedance; and
   f. computing the estimated ideal voltage source value by multiplying the estimated line impedance value by the weld current on one of the line cycles and adding a resulting value to the measured voltage of that line cycle.

5. The method of claim 4 in which the first cycle of line voltage is a cycle in which current has not been commanded to flow and in which the second cycle of line voltage is a cycle in which current has been commanded to flow.

6. The method of claim 5 in which the first cycle of line voltage is the cycle immediately preceding a beginning of a commanded weld pulse.

7. A method of estimating an ideal open circuit voltage and line impedance of a lumped parameter model of an estimated power source for use in resistance welder control applications comprising:
   a. measuring a line voltage on a first subset of half cycles of line voltage in which weld current has not been commanded;
   b. applying a digital filter to the first subset of half cycles of line voltage to create a single value representing an estimate of the voltage of an ideal voltage source;
   c. measuring a line voltage and weld current on a second subset of half cycles of line voltage and weld current on cycles in which weld current has been commanded to flow;
   d. applying a digital filter to a second subset of half cycles of line voltage to create a single value representing an estimate of the voltage of the subset of the weld pulse;
   e. applying a digital filter to the second subset of half cycles of weld current to create a single value representing an estimate of the weld current of the subset of the weld pulse;
   f. computing a difference between the estimate of line voltage of the first subset of half cycles and the estimate of the second subset of half cycles; and
   g. dividing the voltage estimate difference by the estimate of weld current of the second subset of half cycles to obtain an estimate of power system source impedance.

8. The method of claim 7 in which the digital filter computes the mean of the subset of line voltage cycles.

9. The method of claim 8 in which the digital filter computes the mean of the subset of weld current.

10. The method of claim 9 in which the first subset of half cycles of measured line voltage includes at least one half cycle from a cycle immediately preceding initiation of the weld pulse.

11. A digital weld control system for generating from a power source, a weld cycle having a sequence of nominal firing angles to achieve a sequence of target half cycles of weld current applied to a welding load, the digital weld control system comprising:
   A. means for determining a lumped parameter model of the power source including an ideal voltage source and serially connected line impedance;
   B. means for creating an internally maintained lumped parameter model of the welding load based on information gathered from previous welding cycles; and
   C. means for using the lumped parameter models of the power source and welding load to achieve a power source compensated target weld current sequence.

12. The digital weld control system of claim 11 in which the sequence of nominal firing angles is determined by steps comprising:
   a. estimating a line voltage that would occur assuming target current is furnished from an estimated lumped parameter model of the power source;
   b. scaling the desired target current by a ratio of a nominal design voltage to the estimated line voltage to generate a sequence of power source compensated target weld currents; and
   c. determining the nominal firing angle sequence required to achieve the power source compensated target weld current sequence from a model relating weld current and firing angle at nominal line voltage.

13. The digital weld control system of claim 12 in which the determination of nominal firing angle sequence to achieve the power source compensated target weld current sequence from a model relating weld current and firing angle at a nominal line voltage includes the steps comprising:

a. determining a target conduction angle that would achieve the compensated target current at nominal voltage from a lumped parameter load impedance model relating weld current and conduction angle at a specified nominal line voltage; and b. determining a nominal firing angle required to achieve the target conduction angle from a model relating firing angle, power factor and conduction angle.

14. The digital weld control system of claim 12 in which the nominal firing angles of weld cycles subsequent to the first weld cycle in a weld pulse are computed by steps comprising:

a. measuring a line voltage of a previous or present half cycle or full cycle of weld;

b. scaling the desired target current by a ratio of the nominal design voltage to a measured line voltage of a previous or present half cycle or full cycle of weld to create a power source compensated target weld current; and c. determining a nominal firing angle sequence required to achieve the power source compensated target weld current sequence from a model relating weld current and firing angle at nominal line voltage.

15. The digital weld control system of claim 14 in which the determination of nominal firing angle sequence to achieve the power source compensated target weld current sequence from a model relating weld current and firing angle at a nominal line voltage includes the steps comprising:

a. determining a target conduction angle that would achieve the compensated target current at nominal voltage from a lumped parameter load impedance model relating weld current and conduction angle at a specified nominal line voltage; and b. determining a nominal firing angle required to achieve the target conduction angle from a model relating firing angle, power factor and conduction angle.

16. The digital weld control system of claim 11 further including feedback means to adjust the nominal firing angle in response to a difference between the target conduction angle sequence and measured conduction angle sequence for the purpose of minimizing a difference between the target conduction angle sequence and actual conduction angle on subsequent cycles.

17. The digital weld control system of claim 11 further including feedback means to adjust the nominal firing angle in response to a difference between the target weld current sequence and measured weld current for the purpose of minimizing a difference between the target weld current and actual weld current on subsequent cycles.

* * * * *

UNITED STATES PATENT AND TRADEMARK OFFICE
CERTIFICATE OF CORRECTION

PATENT NO. : 6,013,892
DATED : January 11, 2000
INVENTOR(S) : Paul R. Buda and Johnathan H. Bailey It is certified that error appears in the above-identified patent and that said Letters Patent is hereby corrected as shown below:

Column 4,
Line 12, after "equipment" insert -- 16, which is wired to weld sequence I/O 18 which subsequently breaks the weld --;

Column 10,
Line 46, after implementation "6" should be -- δ --.

Signed and Sealed this

Twentieth Day of November, 2001

Attest:

NICHOLAS P. GODICI
Attesting Officer    Acting Director of the United States Patent and Trademark Office